March 6, 1951     J. B. BLACK     2,544,551
FLUID COUPLING AND CLUTCH
Filed July 9, 1947     3 Sheets-Sheet 1
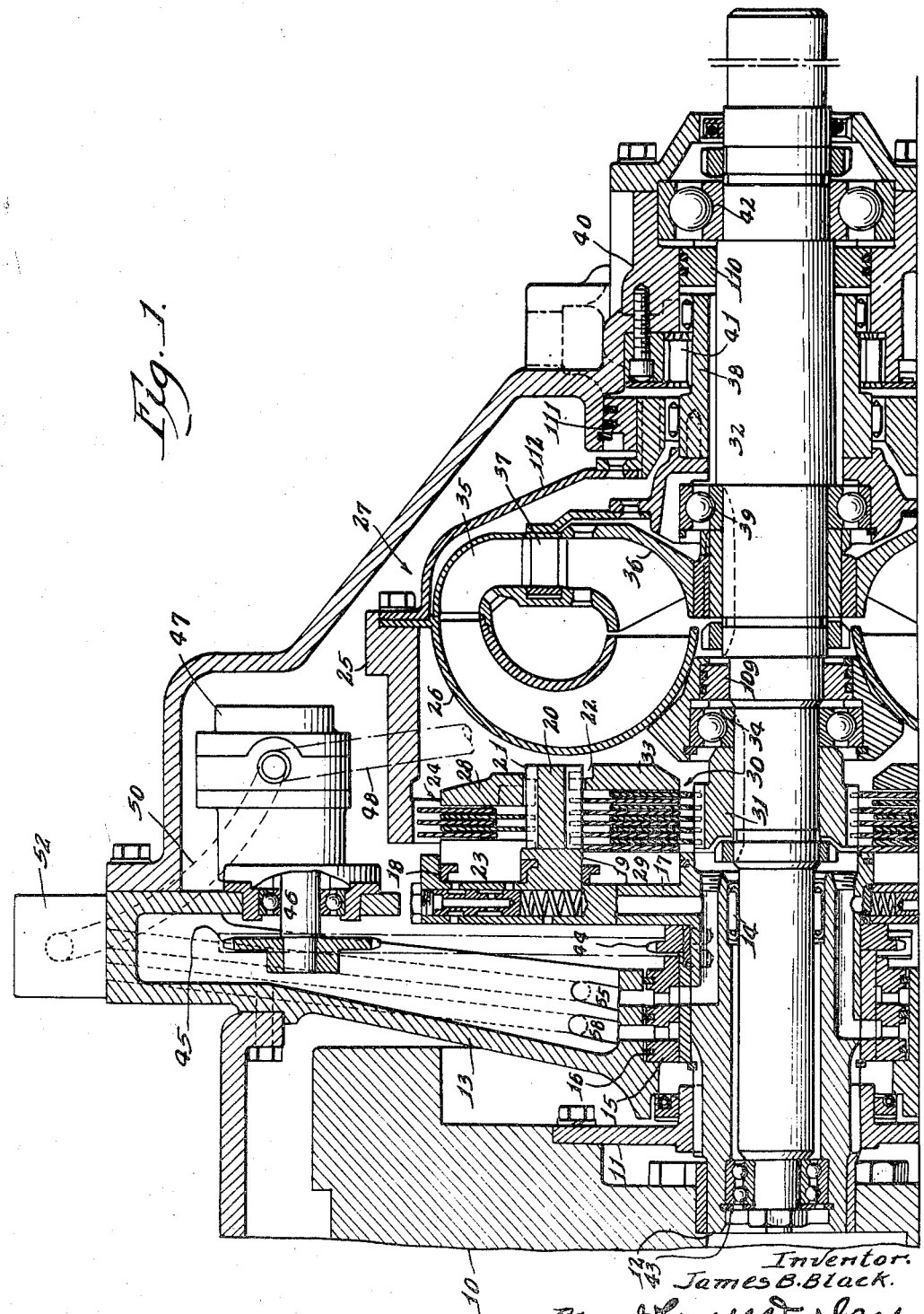
Inventor.
James B. Black.

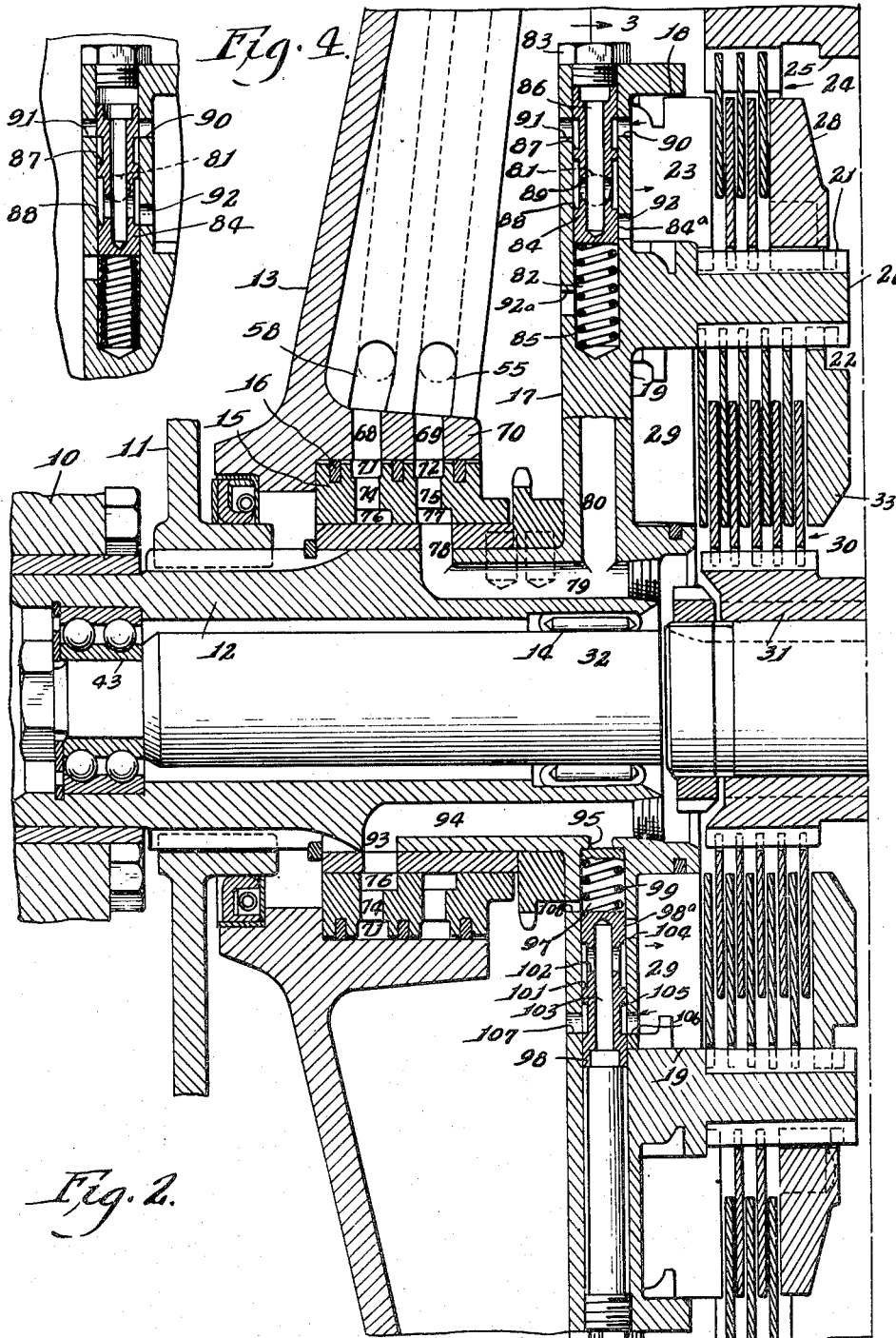

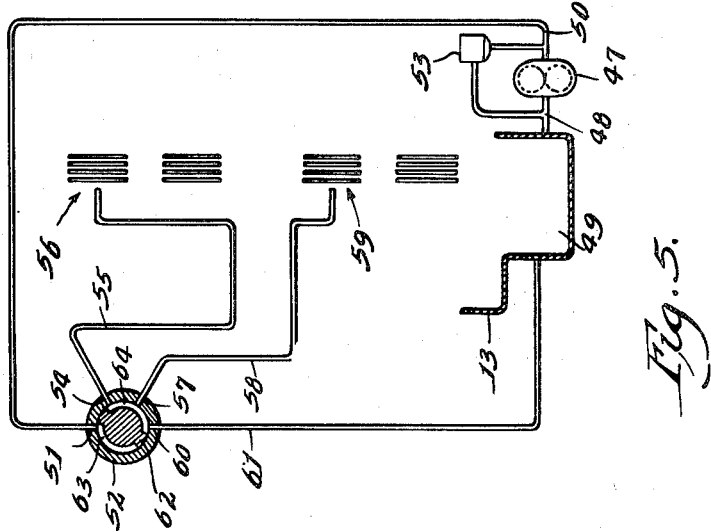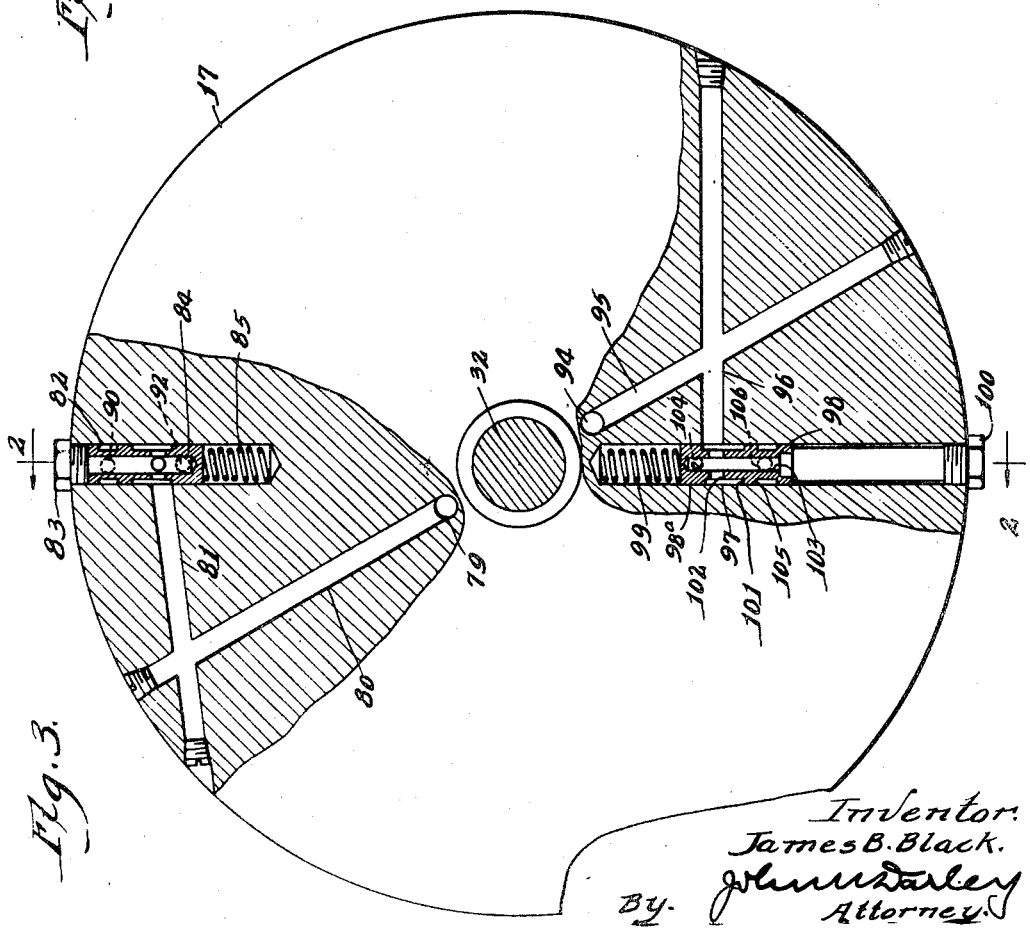

Patented Mar. 6, 1951

2,544,551

UNITED STATES PATENT OFFICE 2,544,551

FLUID COUPLING AND CLUTCH

James B. Black, Rockford, Ill., assignor to Twin Disc Clutch Company, Racine, Wis., a corporation of Wisconsin Application July 9, 1947, Serial No. 759,829

8 Claims. (Cl. 192—3.2)

My invention relates to power transmissions and more particularly to an arrangement incorporating provision for hydraulically transmitting power to the load during the starting and accelerating period and for direct transmission when the load reaches a desired speed in conjunction with the ability to effect a full power shift from one drive to the other in either direction.

Power transmissions which embody hydraulic and direct drive features with the capacity to shift from one drive to the other are well known and desirable because the high starting torque developed in the hydraulic drive enables heavy loads to be rapidly and smoothly accelerated, while the direct drive provides normal, full speed operation at maximum efficiency. However, it is well established that, in characteristic forms of such units, there is a period during the shift from hydraulic to direct drive, or vice versa, when the engine is not connected to the load and hence will accelerate rapidly which is objectionable. For example, in a typical unit wherein a hydraulic torque converter provides the hydraulic drive, the power source is selectively connected to the converter or directly to the driven shaft through friction clutches and in shifting from one drive to another, the unavoidable time required to disengage one clutch and engage the other leaves an interval when the power source is unconnected to the load.

Even in the so-called "Hydramatic" transmission for motor vehicles which is sometimes referred to as a power shift unit, the shifting from one speed to the next requires the simultaneous release of one friction band and the engagement of another. This operation requires careful timing and close adjustment since if one gear engages slightly before the preceding gear is released, the transmission is for the time being in two gears simultaneously which imposes considerable strain on the parts and causes the vehicle to slow down rapidly, while if the timing is slow, the engine is temporarily disconnected from the drive shaft and accelerates rapidly during this period.

It is therefore one object of my invention to devise a power transmission arranged for selective hydraulic or direct drive in which provision is made for shifting from one drive to the other in either direction without at any instant interrupting full power flow through the unit so that the engine or other power source is at all times coupled to the load.

A further object is to provide a transmission of the character indicated in which the hydraulic drive function is performed by a hydraulic torque converter which during the period of hydraulic drive always operates as a converter and hence may be designed for maximum efficiency for this purpose.

A further object is to provide a transmission as above stated which is equipped with hydraulically actuated clutches whose selective or combined operation determines the conditioning of the unit for hydraulic or direct drive.

These and further objects of the invention will be set forth in the following specification, reference being had to the accompanying drawings, and the novel means by which said objects are effectuated will be pointed out definitely in the claims.

In the drawings:

Fig. 1 is a sectional elevation of the upper half of the transmission, the clutches being shown in disengaged position.

Fig. 2 is a fragmentary, sectional elevation of the unit as it appears in Fig. 1, the section through the dump valves for the clutches and the passages leading thereto being taken along the line 2—2 in Fig. 3.

Fig. 3 is a section of the dump valves and passages taken along the line 3—3 in Fig. 2.

Fig. 4 is a fragmentary section showing the shifted position of the dump valve when pressure is applied to the hydraulic drive clutch.

Fig. 5 is a schematic layout of the pressure system leading to the clutches and the pump and control valve therefor, the clutches being disengaged.

Fig. 6 is an enlarged section of the control valve, the rotor being positioned to admit actuating oil to the hydraulic drive clutch.

Referring to Figs. 1 and 2, the numeral 10 designates a flywheel driven by an engine (not shown) and having bolted thereto a ring 11 which is internally splined for driving engagement with an externally splined sleeve 12 that is coaxial with the flywheel. This method of driving the sleeve 12 is by way of example only since other power sources may be employed, including non-prime movers.

The left end of the sleeve 12 is piloted in the flywheel 10 while the right end is journaled on a driven shaft presently described by means of a roller bearing 14. A carrier ring 15 is interposed between the sleeve 12 and a flanged portion 70 of the transmission housing, the ring being provided with piston rings 16 for sealing contact with the flange. The right end of the sleeve 12 carries a transversely related disk 17 whose right face, or the face away from the flywheel, is recessed to provide concentric, annular cylinders 18 and 19, the former being disposed radially outward of the latter. The disk 17 forms the closed ends of the cylinders and extending from the disk beyond the open ends of and between the cylinders is an externally and internally splined or toothed annulus 20 having outer and inner shoulders 21 and 22, respectively, located at the exposed extremity thereof.

An annular piston 23 is slidably mounted in the cylinder 18 in actuating relation to a plurality of clutch plates 24, alternate plates having driving and sliding engagement with the outer splined surface of the annulus 20 while the remaining plates are similarly engaged with one end of a driving ring 25 whose opposite end is bolted to the bladed pump 26 of a hydraulic torque converter 27. The plates 24 are engaged by the piston 23 against an abutment ring 28 slidable on and having splined engagement with the outer surface of the annulus 20 and whose movement during engagement of the plates is limited by the shoulder 21. The piston 23, plates 24 and ring 28 constitute the hydraulic drive clutch 56 of the transmission (see Fig. 5).

An annular piston 29 is slidable in the cylinder 19 and is operably related to a plurality of clutch plates 30, alternate plates being drivably and slidably engaged with the inner surface of the annulus 20 and an externally splined hub 31, respectively, the hub being keyed to a driven shaft 32 coaxial with the flywheel 10 and the clutch plates 24 and 30. The plates 30 are engaged by the piston 29 against an abutment ring 33 slidable on and having splined engagement with the inner surface of the annulus 20 and whose movement during engagement is limited by the shoulder 22. The piston 29, plates 30 and ring 33 form the direct drive clutch 59 of the transmission (see Fig. 5).

The converter pump 26 is journaled on the shaft 32 by a ball bearing 34 and its outlet and inlet ends are respectively operably related to connected, bladed turbines 35 and 36 constituting first and second stages of the converter and which are keyed to the shaft 32. The bladed, reaction member 37 is located between the turbines 35 and 36 and functions in the characteristic manner with respect thereto when power is transmitted through the converter. A sleeve 38 is secured at one end to the member 37 and is journaled on and in spaced, concentric relation to the shaft 32 by a ball bearing 39. Interposed between the opposite end of the sleeve 38 and a hub 40 forming part of the housing 13 is a freewheel or overrunning clutch 41 of characteristic construction which is arranged to hold the reaction member 37 stationary during power transmission through the converter and to permit it to rotate with the pump 26 and turbines 35 and 36 during direct drive. One end of the shaft 32 is journaled in the hub 40 by a ball bearing 42 and extends beyond the hub for coupling to a load while the opposite end is piloted in the flywheel and specifically in the piloted end of the sleeve 12 by a bearing 43. The working liquid in the converter 27 is sealed by piston ring sealing members 109 and 110 interposed, respectively, between the shaft 32 and the pump 26 and hub 40, and a similar sealing member 111 is positioned between a suitably shaped portion of the housing 13 and an annular shell 112 bolted to the pump 26 in enclosing relation to the turbines 35 and 36.

Selective hydraulic actuation of the hydraulic and direct drive clutches is accomplished by the following instrumentalities (see Figs. 1, 2 and 5). A sprocket 44 is secured to the sleeve 12, thus being directly driven by the power source, and is drivably connected to a sprocket 45 keyed to the driving shaft 46 of an oil pump 47 mounted interiorly of the housing 13. The pump inlet connects by a pipe 48 (see Figs. 1 and 5) with a sump 49 formed in the bottom of the housing 13 and a discharge pipe 50 leads from the pump to a port 51 provided in the casing of a control valve 52 mounted exteriorly of the housing 13 for convenient access by the operator. A pressure relief valve 53 of typical construction is bridged around the pump in communication with the pipes 48 and 50 to relieve the pipe 50 when the pressure therein exceeds a predetermined value.

The casing of the control valve 52 includes a port 54 communicating with a pipe 55 for supplying actuating oil in the manner presently described to the hydraulic drive clutch 56, a port 57 communicating with a pipe 58 for supplying actuating oil to the direct drive clutch 59, and a port 60 communicating by way of a pipe 61 with the sump 49. A rotor 62 is rockable in the valve casing and may be externally actuated by a control handle (not shown). Arcuate channels 63 and 64 are recessed in the periphery of the rotor 62 and when the latter is in the position shown in Fig. 5, the channel 64 connects the ports 54 and 57 with the port 60 and hence with the sump 49, while the channel 63 communicates only with the port 51, the pump 47 bypassing the oil through the relief valve 53. This position of the valve corresponds to disengaged positions of the clutches 56 and 59 with the power source idling.

The details of the hydraulic circuits between the control valve 52 and the clutches 56 and 59, shown diagrammatically in Fig. 5, are illustrated in detail in Figs. 2 and 3 to which reference will now be made. The pipes 55 and 58 extend through the housing 13 and their delivery ends communicate, respectively, with the outer ends of passages 68 and 69 provided in the flanged portion 70 of the housing 13 in which fits the carrier ring 15. The inner ends of the passages 68 and 69 communicate, respectively, with annular channels 71 and 72 in the outer periphery of the ring 15 and the latter are in constant communication through radial passages 74 and 75 with annular channels 76 and 77, all respectively, provided in the inner periphery of the ring 15.

The channel 77 constantly communicates through radial passage 78 and longitudinal passage 79 in the sleeve 12 with the inner end of a radial passage 80 in the disk 17. The outer end of the passage 80 (see Fig. 3) connects by a transversely related passage 81 with an elongated, radial pocket 82 extending inwardly from the periphery of the disk 17, the outer end of the pocket being closed by a plug 83. Slidable in the pocket 82 is a piston dump valve 84 which, in the position of parts shown in Fig. 2, is maintained in an outer position by a spring 85 interposed between the end of the pocket and the head of the valve which is inwardly disposed.

The valve 84 includes an internal bore 86 whose inner end is closed by the valve head and the lateral surface of the valve skirt is recessed to provide spaced, annular grooves 87 and 88, the former being positioned radially outward of the latter which possesses the greater height for a purpose presently explained. The bore 86 and the channel 88 are at all times connected by ports 89 in the skirt of the valve 84. When the valve 84 is in the position shown in Fig. 2, the groove 87 communicates through outlet and discharge ports 90 and 91, respectively, in the disk 17 with the cylinder 18 and the interior of the housing 13 and therefore the sump 49, while the groove 88 registers with the discharge end of the passage 81 and a land 84ª provided on the valve 84 masks an inlet port 92 which communicates with the cylinder 18. It will be noted that the height of the groove 88 is sufficient to provide a radially outward overlap of the discharge end of the passage 81 in the position shown so that it is possible for the valve 84 to move inward for some distance without masking this discharge end. A port 92ª provides communication between that part of the pocket 82 which is occupied by the spring 85 to prevent oil locking in this portion of the pocket which might otherwise interfere with inward movement of the dump valve 84.

For the purpose of actuating the direct drive clutch 59, oil delivered to the channel 76 (see Fig. 2) flows through a radial passage 93 and a longitudinal passage 94 in the sleeve 12 to the inner end of a radial passage 95 in the disk 17. The passage 95 connects by a transversely related passage 96 with a radial pocket 97 extending inwardly from the periphery of the disk 17 and which is similar to the pocket 82. The pockets 82 and 97 may be diametrally related and since the latter is intended to service the direct drive clutch, its length is greater than the pocket 82.

Slidable in the pocket 97 is a piston dump valve 98 which is similar to the valve 84 and is biased in the outer position shown in Fig. 3, corresponding to a disengagement of the direct drive clutch 59 by a spring 99 which seats on the inner end of the pocket and abuts the valve against an elongated plug 100 which closes the outer end of the pocket. In the position of the dump valve 98 shown in Figs. 2 and 3, the discharge end of passage 96 communicates through annular groove 101 in the surface of the valve and ports 102 in the skirt of the valve with the interior 103 of the valve, and a land 98ª provided on the valve 98 masks an inlet port 104 leading to the cylinder 19, while an annular groove 105 in the outer surface of the dump valve registers with outlet port 106 communicating with the cylinder 19 and with discharge port 107 connecting the pocket 97 with the interior of the transmission housing 13 and therefore the sump. The grooves 101 and 105 are related to the ports 104, 106 and 107 in the same manner and for the same purpose as the grooves in the dump valve 84 are related to the parts associated therewith. A port 108 also communicates the spring end of the pocket 97 with the interior of the housing 13 to prevent oil locking.

Considering the operation of the transmission with the control valve rotor 62 in the position shown in Fig. 5 and the engine idling, oil is circulated by the pump 47 through the relief valve 53, the ports 54 and 57 connect by way of the channel 64 and pipe 61 with the sump 49 so that actuating pressure is not present in the pipes 55 and 58, and the dump valves 84 and 98 occupy the positions shown in Figs. 2 and 3. Under these conditions, the clutches 56 and 59 are disengaged and the engine is disconnected from the shaft 32.

In connecting the engine to the load, advantage is taken of the high starting torque and capacity for rapid, smooth acceleration afforded by the converter and to drive through this unit, the valve rotor 62 is rocked clockwise to the position shown in Fig. 6 in which the channel 63 connects the ports 51 and 54 whereupon the pressure of the pump 47 becomes effective in the pipe 55 and thence through connecting passages 78, 79, 80 and 81 in the sleeve 12 and disk 17 to that portion of the pocket 82 included in the groove 88. The oil then flows through port 89 to the interior of the dump valve 84, thus forcing this valve radially inward against the spring 85 to the position shown in Fig. 4. In this position, the valve skirt outwardly of the groove 87 masks the outlet port 90 and the discharge port 91, while the inlet port 92 is unmasked so that pressure builds up in the cylinder 18 to thereby shift the piston 23 to engage the clutch 56. In the position of the valve rotor 62 shown in Fig. 6, the channel 63 is displaced from the port 57 and hence pressure is not effective in the cylinder 19 and the direct drive clutch 59 remains disconnected.

With the clutch 56 engaged, the engine is connected to the shaft 32 through the torque converter 27 with the reaction member 37 held from rotating in reverse direction by the overrunning clutch 41. When the load is accelerated to the desired speed, the control valve rotor 62 is further rotated in a clockwise direction to additionally register the channel 63 with the port 57, pressure being maintained through the port 54 and hence engaging pressure is maintained on the hydraulic drive clutch 56.

The pressure established in the pipe 58 thereupon becomes effective through the passages 93, 94, 95 and 96 in the sleeve 12 and disk 17 to that portion of the pocket 97 included in the groove 101. The oil then flows through port 102 to the interior of the dump valve 98, thus forcing this valve radially inward against the spring 99 to a position in which the outer skirt portion of the valve masks the outlet port 106 and discharge port 107 while the inlet port 104 is unmasked and registers with the groove 101, the conditions being similar to those discussed in connection with the dump valve 84.

Pressure is accordingly built up in the cylinder 19 to thereby engage the clutch 59 and establish direct drive between the power source and the shaft 32. Prior to this direct drive connection, the speed of the shaft 32 is less than the engine speed due to the usual loss through the converter, but when the clutch 59 is engaged, the shaft speed is equalized with that of the engine.

Under these conditions and since the hydraulic drive clutch 56 remains engaged, the converter pump 26 and turbines 35 and 36 rotate at the same or engine speed. Hence, there will not be any reaction against the blades of the reaction member 37 and the latter, as it is released by the overrunning clutch 41, will begin to rotate with the pump and turbines. Since power is not then being transmitted through the converter and all parts thereof are rotating at substantially the same speed, the power losses in the converter circuit are negligible. Actually, the reaction member 37 rotates at a slightly slower speed than the pump and turbines due to the drag of the bearings and the overrunning clutch, but the difference is small.

If the load becomes too heavy to be carried in direct drive, the control valve rotor 62 is rocked counterclockwise to the position shown in Fig. 6, thereby interrupting the oil pressure to the pipe 58 and hence to the direct drive clutch 59. Since the oil pressure is not effective within the dump valve 98, the spring 99 returns the valve from its then inward shifted position to that shown in Fig. 2 to unmask the ports 106 and 107 and permit discharge of the oil in the cylinder 19 to the sump. Therefore, the direct drive clutch 59 is disengaged and power drive is then through the converter 27.

The outstanding advantage of the above construction is that the transmission is characterized by a full power shift, the engine at no time being completely disconnected from the load. As load conditions vary, the drive through the transmission may be shifted at will from hydraulic to direct drive and vice versa with the hydraulic drive clutch 56 being always engaged.

Power flow through the transmission may be interrupted by turning the valve rotor 62 to the position shown in Fig. 5. If the position of the rotor prior to turning is that corresponding to direct drive, then the Fig. 5 position cuts off oil pressure to both clutches and the dump valves 84 and 98 are returned to the positions shown in Fig. 2 to discharge oil from the clutch cylinders 18 and 19, respectively, but if the transmission is in hydraulic drive, then moving the rotor 62 to the Fig. 5 position only denies pressure to the clutch 56 since the clutch 59 is already disengaged and the dump valve 84 alone is moved to the discharging position shown in Fig. 2 by the spring 85.

The special design of the dump valves 84 and 98 provides assurance that the associated clutch cylinders will be rapidly and completely emptied. Without such valves, the centrifugal pressure head developed in the oil by the rotating disk 17 would be sufficient to keep the clutches engaged and if the only discharge route for the oil was through the supply passages, quick disengagement of the respective clutches would be impossible. The dump valves solve this problem since they are located immediately adjacent the associated clutch cylinders. Centrifugal force and the bias provided by the spring 85 tend to keep the valve 84 in the discharging position shown in Fig. 2 and when oil pressure is admitted to the pipe 55 leading to the clutch 56, the valve is moved inwardly to the position shown in Fig. 4 against the spring 85 and centrifugal force acting on the valve. The weight of the valve is such that when oil pressure to the clutch 56 is cut off, the centrifugal force effective on the valve equals the centrifugal pressure head developed in the oil so that the spring 85 returns the valve to the discharge position. The dump valve 98 operates in like manner.

I claim:

1. In a power transmission, the combination of a driven shaft, hydraulic power circuit means connected to the shaft, first hydraulically actuated clutch means for connecting the circuit means to a power source, second hydraulically actuated clutch means shiftable between positions providing and interrupting a direct drive between the source and shaft while the first clutch means is engaged, and a hydraulic pressure system including both clutch means and a control valve, the valve being operable to determine the actuation of both clutch means.

2. In a power transmission, the combination of a driven shaft, a hydraulic torque converter including a pump member, a turbine member and a reaction member, the turbine member being keyed to the shaft and an overrunning clutch being interposed between the reaction member and a fixed part of the transmission, first hydraulically actuated clutch means for connecting the pump member to a power source, second hydraulically actuated clutch means shiftable between positions providing and interrupting a direct drive between the source and shaft while the first clutch means is engaged, and a hydraulic pressure system including both clutch means and a control valve, the valve being operable to determine the actuation of both clutch means.

3. In a power transmission, the combination of a driven shaft, a hydraulic torque converter including a pump member, a turbine member and a reaction member, the turbine member being keyed to the shaft and an overrunning clutch being interposed between the reaction member and a fixed part of the transmission, a member arranged for connection to a power source, outer and inner, concentric and hydraulically actuated, friction clutches carried by the member, friction parts of each clutch being drivably connected to the member, other friction parts of the outer clutch being drivably connected to the pump member and other friction parts of the inner clutch being drivably connected to the shaft, and a hydraulic pressure system including both clutches and a control valve, the valve being operable to determine the actuation of the outer clutch and selectively the engagement and disengagement of the inner clutch while the outer clutch is engaged.

4. In a power transmission, the combination of a driven shaft, hydraulic power circuit means connected to the shaft, a member arranged for connection to a power source, outer and inner, concentric and hydraulically actuated friction clutches carried by the member, friction parts of each clutch being drivably connected to the member, other friction parts of the outer clutch being drivably connected to the circuit means and other friction parts of the inner clutch being drivably connected to the shaft, and a hydraulic pressure system including both clutches and a control valve, the valve being operable to determine the actuation of the outer clutch and selectively the engagement and disengagement of the inner clutch while the outer clutch is engaged.

5. In a power transmission, the combination of a driven shaft, hydraulic power circuit means connected to the shaft, a disk arranged for connection to a power source and recessed in one face to provide concentric, annular cylinders, a piston slidable in each cylinder, outer and inner, friction clutches carried by the disk and engageable by the respective pistons, friction parts of each clutch being drivably connected to the disk, other friction parts of the outer clutch being drivably connected to the circuit means and other friction parts of the inner clutch being drivably connected to the shaft, and a hydraulic pressure system including a control valve, both cylinders each of which is provided with an inlet port and an outlet port providing communication between the associated cylinder and an adjacent pocket in the disk, each pocket including a discharge port communicating with the transmission sump, and a piston dump valve slidable in each pocket and biased to a position in which the outlet and discharge ports for the associated cylinder are placed in communication, the control valve being operable to admit the system liquid to the interior of the outer cylinder dump valve to shift the latter to a position masking the outlet port and admitting system liquid to the outer cylinder to engage the outer clutch and selectively operable to admit or deny system liquid to the inner cylinder for engaging or disengaging the inner clutch while the outer clutch is engaged.

6. In a power transmission, the combination of a driven shaft, hydraulic power circuit means connected to the shaft, first hydraulically actuated clutch means for connecting the circuit means to a power source, second hydraulically actuated clutch means shiftable between positions providing and interrupting a direct drive between the source and shaft while the first clutch means is engaged, and a hydraulic pressure system including both clutch means and a control means, the control means being operable to determine the actuation of both clutch means.

7. In a power transmission, the combination of a driven shaft, a hydraulic torque converter including a pump member, a turbine member and a reaction member, the turbine member being keyed to the shaft and an overrunning clutch being interposed between the reaction member and a fixed part of the transmission, a member arranged for connection to a power source, outer and inner, concentric and hydraulically actuated, friction clutches carried by the member, friction parts of each clutch being drivably connected to the member, other friction parts of one clutch being drivably connected to the pump member and other friction parts of the other clutch being drivably connected to the shaft, and a hydraulic pressure system including both clutches and a control means, the control means being operable to determine the actuation of the pump connected clutch and selectively the engagement and disengagement of the shaft connected clutch while the pump connected clutch is engaged.

8. In a power transmission, the combination of a driven shaft, hydraulic power circuit means connected to the shaft, a member arranged for connection to a power source, outer and inner, concentric and hydraulically actuated friction clutches carried by the member, friction parts of each clutch being drivably connected to the member, other friction parts of one clutch being drivably connected to the circuit means and other friction parts of the other clutch being drivably connected to the shaft, and a hydraulic pressure system including both clutches and a control means, the control means being operable to determine the actuation of the circuit means connected clutch and selectively the engagement and disengagement of the shaft connected clutch while the circuit means clutch is engaged.

JAMES B. BLACK.

REFERENCES CITED

The following references are of record in the file of this patent:

UNITED STATES PATENTS

| Number | Name | Date |
| --- | --- | --- |
| 2,250,656 | Schjolin | July 29, 1941 |
| 2,279,019 | Black | Apr. 7, 1942 |
| 2,351,483 | Carnagua | June 13, 1944 |
| 2,369,369 | Peterson et al. | Feb. 13, 1945 |
| 2,400,093 | Batten | May 14, 1946 |
| 2,449,608 | Le May | Sept. 21, 1948 |